P. Estes,
Dressing Staves.
N° 4,869.   Patented Dec. 3, 1846.
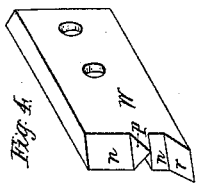
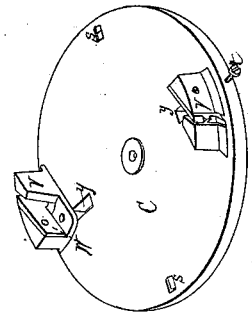
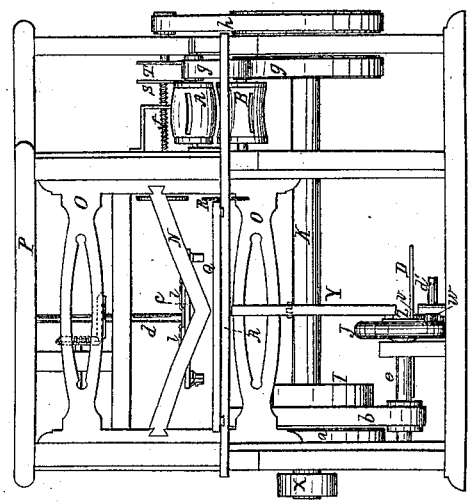
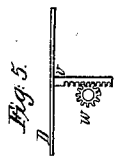
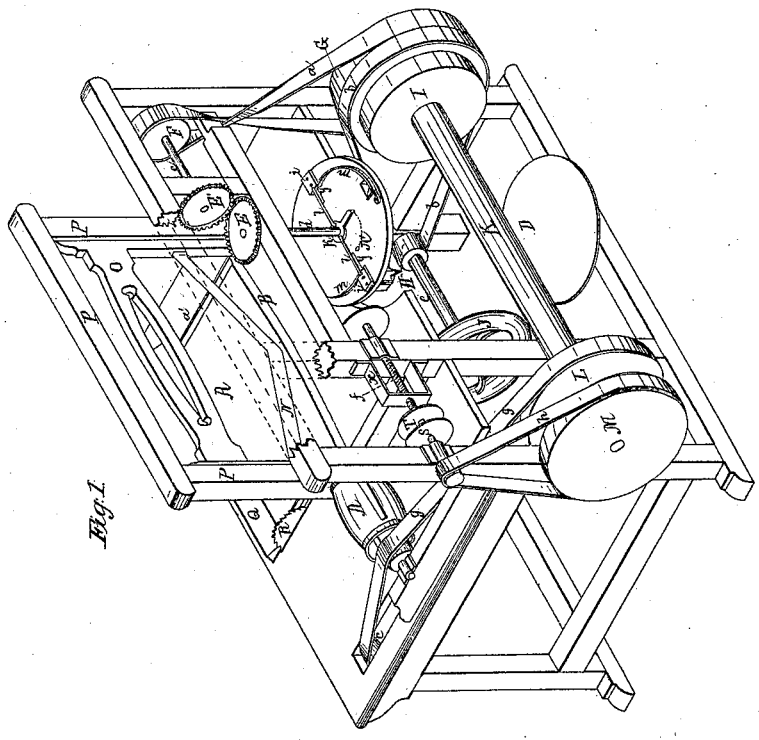

UNITED STATES PATENT OFFICE.

PHILIP ESTES, OF ADRIAN, MICHIGAN.

MACHINERY FOR CHAMFERING, CROZING, AND HOWELING CASKS.

Specification of Letters Patent No. 4,869, dated December 3, 1846.

*To all whom it may concern:*

Be it known that I, PHILIP ESTES, of Adrian, in the county of Lenawee and State of Michigan, have invented a new and Improved Machine for Making Barrels, Casks, &c.; and I do hereby declare the following to be a full, clear, and exact description of its construction and operation, reference being had to the accompanying drawings, making a part of this specification, in which—

Figure 1, is a perspective view and Fig. 2, is an elevation. Fig. 3, is an enlarged perspective view of the cutter wheel C, detached from the machine, representing its under side. Fig. 4, is an enlarged perspective view of a howeling, crozing and chamfering cutter W, detached from the cutter wheel C; Fig. 5 is an elevation of an adjustable platform D, detached from the machine.

The same letters refer to corresponding parts in all the figures.

My improved machinery for performing the different operations in the manufacture of barrels, &c., is secured in a suitable frame (represented in Figs. 1, and 2, of the accompanying drawings) constructed in any well known manner.

The first operation to be performed in the construction of barrels, is the dressing the staves; this is effected as follows: The staves are taken in a rough state and passed between the two cutting cylinders A and B, which reduces them to a uniform thickness, and imparts to one side a convex and to the other a concave form, the edges of the cutters in A, being of a convex, and those in B, of a concave form. The cutters in A and B, are secured to them in the usual manner. The next operation to be performed, is the bringing the staves to a uniform and proper length, and the giving to their edges such a swell and bevel, that when they are set up, they can be brought to the proper barrel form. This is effected as follows: On the table A', of the supporting frame, is placed a sliding inclined rest Q; having projecting at each end, on its under side, which move in the grooves a', a', in the table. At one end of the sliding inclined rest, there projects through the table A', a circular saw R; a curved angular knife N, secured in the gate O, is vibrated up and down in the frame P, passing through the aperture B', in the table A'. The staves are brought to a uniform and proper length, by placing them upon the sliding rest Q, and pressing them forward against the edge of the saw R. When the staves have been brought to a uniform length, they are pushed forward on the rest Q, until their edges are brought in contact with the vibrating knife N, which cuts them to the proper swell and bevel. The edges of the staves can be varied to suit circles of different sizes, by varying the inclination of the face of the inclined rest Q. The staves when thus prepared, are set up, and are then ready for the next operation, which is the jointing, howeling, crozing, and chamfering their ends for the reception of the barrel heads; which is effected in the following manner: The staves necessary to form a barrel being set up and secured in the usual manner, are placed upon and fastened to the adjustable platform D, located immediately beneath the cutter wheel C. The wheel C, is attached to the lower end of the vertical shaft d, and has secured to it jointing cutters s, s, and howeling, crozing, and chamfering cutters W, W. The jointing cutters s, s, are secured in apertures in the cutter wheel, in the same manner that plane irons are usually fastened. The cutters W, W, are secured in stocks V, V, which are attached to the under side of the cutter wheel in such a manner as to give to the edges of the cutters a flexible bearing against the inner sides of the ends of the staves. The stocks V, V, are secured to the cutter wheel by means of bolts passing through the radial slots y, y, conecting them to the sliding plates i, i, on the upper side of the wheel; m, m, are springs secured to the upper side of the cutter wheel, pressing outward upon the plates i, i. Set screws t, t, for regulating the position of the stocks V, are inserted into the edge of the cutter wheel, opposite the ends of the radial slots y, y. The sliding plates i, i, are connected to opposite sides of a collar k. Surrounding the shaft d, by the rods l, l; z, is a lever projecting from the periphery of the collar k, on the under side of the extremity of the lever z, there projects a holding pin. By turning the lever z, to the left, and inserting the holding pin at its extremity in the aperture j, in the cutter wheel, the sliding plates i, i, the stocks V, V, and cutters W, W, will be drawn in toward the center of the wheel and secured.

Previous to placing the staves upon the adjustable platform D, the cutters W, W, are driven in toward the center of the cutter wheel and secured, as above set forth. The cutter wheel is then put in motion, and the upper ends of the staves are pressed against the jointing cutters S, S, by elevating the platform D. As soon as the ends of the staves are jointed, the lever $z$, is disengaged and the cutters W, W, are pressed outward by the springs $m$, $m$, against the inner side of the ends of the staves, and forms the howel, croze, and chamfer, the portion $n$, of the edge of the cutters forming the howel, the portion $p$, the croze, and $r$, the chamfer. A rack $v$, descends vertically from the center of the adjustable platform D, which works into a pinion $W$; the platform is elevated or depressed by turning the pinion $w$, by means of a lever inserted into its axle $d'$. When both ends of the hooped staves have been howeled, crozed, and chamfered, they are ready for the reception of the heads.

The heading stuff is dressed and reduced to a uniform thickness, by passing it between straight cutting cylinders, substituted in the place of the cylinders A, and B. The heads of the barrels are cut out and edged in a lathe, secured to one corner of the supporting frame. S, is a circular chuck, and T, is a loose disk on the end of a tail screw $f$, forming the lathe. A suitable number of heading pieces are secured between the chuck S, and the disk T, to form a head, and it is then cut out and brought to an edge by turning chisels. Motion is communicated to the cutter wheel C, as follows: The bevel wheel E, on the top of shaft $d$, is geared into the wheel E', on the horizontal shaft $c$; the pulley F, on shaft $c$, is connected to and driven by the pulley G, on the main shaft K, by means of the band $a$. The pulley G, also communicates motion to the vibrating knife N, in the following manner: The pitman Y, connects the vibrating frame O, with the crank Z, on the shaft $e$, which receives its motion from the band $b$, connecting the pulley H, on the same, with the pulley G. The pulley L, on the driving shaft, communicates motion to the cutting cylinders A, and B, and the circular saw R, by means of the band $g$. $c'$ is a pulley on the shaft of the circular saw. The pulley M, on the driving shaft, communicates motion to the chuck S, by means of the band $h$.

Having thus fully described the construction and operation of my improved machine for making barrels, casks, &c., what I claim therein as new and desire to secure by Letters Patent is—

The attaching the howeling, crozing and chamfering cutters W, W, to the disk C, in such a manner as to give them an adjustable and an elastic outward bearing against the inner sides of the ends of the hooped staves of a barrel or cask, by means of stocks V, V, sliding plates $i$ $i$, radial slots $y$, $y$, springs $m$, $m$, set screws $t$, $t$, collar $k$, connecting rods $l$, $l$, and lever $z$, combined and operating substantially as herein set forth.

PHILIP ESTES.

Witnesses:
DANIEL D. SINCLAIR,
H. W. COMSTOCK.